United States Patent
Ahn et al.

(10) Patent No.: US 8,130,220 B2
(45) Date of Patent: Mar. 6, 2012

(54) METHOD, MEDIUM AND APPARATUS DETECTING MODEL COLLISIONS

(75) Inventors: Jeong-hwan Ahn, Suwon-si (KR); Kee-chang Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 943 days.

(21) Appl. No.: 12/003,771

(22) Filed: Dec. 31, 2007

(65) Prior Publication Data

US 2008/0186312 A1  Aug. 7, 2008

(30) Foreign Application Priority Data

Feb. 2, 2007  (KR) .................. 10-2007-0011270

(51) Int. Cl.
*G06T 17/10* (2006.01)
(52) U.S. Cl. ..................................... 345/420
(58) Field of Classification Search .............. 345/420
See application file for complete search history.

(56) References Cited

U.S. PATENT DOCUMENTS

| | | | |
|---|---|---|---|
| 5,515,489 A | | 5/1996 | Yaeger |
| 5,892,462 A | * | 4/1999 | Tran ............................... 340/961 |
| 5,990,896 A | * | 11/1999 | Barrus .......................... 345/420 |
| 6,862,026 B2 | | 3/2005 | Zachmann |
| 7,590,514 B1 | * | 9/2009 | Olovsson ........................... 703/6 |
| 2001/0026272 A1 | * | 10/2001 | Feld et al. ...................... 345/419 |
| 2003/0230724 A1 | * | 12/2003 | Koops et al. ............. 250/363.08 |
| 2004/0010346 A1 | * | 1/2004 | Stewart et al. ................. 700/255 |
| 2004/0088090 A1 | * | 5/2004 | Wee ................................. 701/35 |
| 2007/0177011 A1 | * | 8/2007 | Lewin et al. .................. 348/118 |
| 2007/0268288 A1 | * | 11/2007 | Duriez et al. ................. 345/420 |

FOREIGN PATENT DOCUMENTS

| | | |
|---|---|---|
| JP | 11-045350 | 2/1999 |
| JP | 2000-104784 | 4/2000 |
| JP | 2001-233498 | 8/2001 |
| JP | 2003-109038 | 4/2003 |
| JP | 2004-005572 | 1/2004 |
| JP | 2004-220273 | 8/2004 |
| JP | 2005-071285 | 3/2005 |
| JP | 2005-310021 | 11/2005 |
| JP | 2006-107288 | 4/2006 |
| KR | 10-2007-0006069 | 1/2007 |

OTHER PUBLICATIONS

Geometric modeling based on triangle meshes Mario Botsch, Mark Pauly, Christian Rossl, Stephan Bischoff, Leif Kobbelt Jul. 2006 SIGGRAPH '06: SIGGRAPH 2006 Courses Publisher: ACM.*
Korean Office Action for corresponding Korean Patent Application No. 10-2007-0011270 dated Apr. 2, 2008 (5 pgs).

* cited by examiner

*Primary Examiner* — Javid Amini
(74) *Attorney, Agent, or Firm* — Staas & Halsey LLP (57) ABSTRACT

A method, medium and apparatus determining whether models collide with each other. In the model collision detecting method, medium and apparatus, it is possible to quickly examine whether models collide, and to recognize the collision generated at an arbitrary time, which is not a predetermined collision check time of the models, without missing the recognition of the collision generated at the arbitrary time, by determining whether paths reflecting movement of the model primitives between the current time and a previous time overlap when the model primitives do not collide at the current time, determining whether the model primitives collide with each other at an arbitrary time between the current time and the previous time when the path primitives overlap each other, and recognizing that the models collide with each other at the arbitrary time when the model primitives collide with each other at the arbitrary time.

20 Claims, 10 Drawing Sheets

METHOD, MEDIUM AND APPARATUS DETECTING MODEL COLLISIONS

CROSS-REFERENCE TO RELATED APPLICATIONS

This application claims the benefit of Korean Patent Application No. 10-2007-0011270, filed on Feb. 2, 2007, in the Korean Intellectual Property Office, the disclosure of which is incorporated herein in its entirety by reference.

BACKGROUND

1. Field

One or more embodiments of the present invention relate to collision detection, and more particularly, to a method, medium and apparatus detecting collisions between models included in a scene.

2. Description of the Related Art

In computer modeling, a conventional model collision detection apparatus determines whether models collide with each other, and recognizes a collision between the models if it is determined that the models do collide with each other. Such a model collision detection apparatus has to quickly detect collisions between models without missing any collisions, regardless of when the collisions might occur. For example, in the case of a three-dimensional (3D) racing game, when a moving vehicle manipulated by a game user collides with another vehicle, or with a tree or other object outside of the track, the game user's score may have to be quickly adjusted. Accordingly, a model collision detection apparatus included in a system executing the 3D racing game has to quickly detect such a collision without missing it.

A conventional model collision detection apparatus determines whether such a collision occurs at one or more predetermined collision check times. Accordingly, the conventional model collision detection apparatus cannot recognize a collision if the collision occurs at a time which does not fall within the predetermined collision check times. As a result, a problem exists in that the conventional model collision detection apparatus may fail to recognize the collision when the collision occurs at a time that is not a predetermined collision check time.

Also, since the conventional model collision detection apparatus determines whether models collide with each other by detecting whether parts of the models overlap, the examination takes a long time to perform as the shapes of the models are complicated. As a result, the conventional model collision detection apparatus cannot quickly examine whether models collide with each other, particularly when the complexity of the shape of a model is high.

SUMMARY

One or more embodiments of the present invention provide a model collision detection method capable of quickly examining whether models collide with each other, and recognizing the collision between the models regardless of whether the collision between the models occur at a predetermined collision check time.

One or more embodiments of the present invention also provide a model collision detection apparatus capable of quickly examining whether models collide with each other, and recognizing the collision between the models regardless of whether the collision between the models occur at a predetermined collision check time.

One or more embodiments of the present invention provide a computer-readable recording medium capable of quickly examining whether models collide with each other, and recognizing the collision between the models regardless of whether the collision between the models occur at a predetermined collision check time.

Additional aspects and/or advantages will be set forth in part in the description which follows and, in part, will be apparent from the description, or may be learned by practice of the invention.

To achieve at least the above and/or other aspects and advantages, embodiments of the present invention include a method of determining whether models enveloped by model primitives collide with each other. The method includes determining whether the model primitives collide with each other at a current time, determining whether paths reflecting movement of the model primitives between the current time and a previous time overlap each other when the model primitives do not collide with each other at the current time, determining whether the model primitives collide with each other at an arbitrary time between the current time and the previous time when the path primitives overlap each other, and recognizing that the models collide with each other at the arbitrary time when the model primitives collide with each other at the arbitrary time.

To achieve at least the above and/or other aspects and advantages, embodiments of the present invention include an apparatus for determining whether models enveloped by model primitives collide with each other. The apparatus includes, a first examination unit to determine whether the model primitives each collide with each other at a current time and to generate a first control signal corresponding to a result of the determination of whether the model primitives collide with each other at the current time, a second examination unit to determine whether paths reflecting movement of the model primitives between the current time and a previous time overlap each other in response to the first control signal and generating a second control signal corresponding to a result of the determination of whether the paths overlap each other, the first examination unit determining whether the model primitives collide with each other at an arbitrary time between the current time and the previous time in response to the second control signal and generating a third control signal corresponding to a result of the determination of whether the model primitives collide with each other at the arbitrary time, and a collision recognizing unit to recognize that the models collide with each other in response to at least one of the first control signal and the third control signal.

To achieve at least the above and/or other aspects and advantages, embodiments of the present invention include a method of determining whether models enveloped by model primitives collide with each other. The method includes determining whether the model primitives collide with each other at a current time, generating path primitives that envelop paths of the model primitives when the model primitives do not collide with each other at the current time, the paths reflecting movement of the model primitives between the current time and a previous time, determining whether the model primitives collide with each other at an arbitrary time between the current time and the previous time when the path primitives overlap each other, and recognizing that the models collide with each other at the current time when the model primitives collide with each other at the current time and recognizing that the models collide with each other at the arbitrary time when the model primitives collide with each other at the arbitrary time.

To achieve at least the above and/or other aspects and advantages, embodiments of the present invention include an apparatus for determining whether models enveloped by model primitives collide with each other. The apparatus includes a first examination unit to determine whether the model primitives each collide with each other at a current time and to generate a first control signal corresponding to a result of the determination of whether the model primitives collide with each other at the current time, a path primitive generating unit to generate path primitives that envelop paths of the model primitives when the model primitives do not collide with each other at the current time, the paths reflecting movement of the model primitives between the current time and a previous time, a second examination unit to determine whether the path primitives overlap each other in response to the first control signal and generating a second control signal corresponding to a result of the determination of whether the path primitives overlap each other, the first examination unit to determine whether the model primitives collide with each other at an arbitrary time between the current time and a previous time in response to the second control signal and generating a third control signal corresponding to a result of the determination of whether the model primitives collide with each other at the arbitrary time, and a collision recognizing unit to recognize that the models collide with each other in response to at least one of the first control signal and the third control signal.

BRIEF DESCRIPTION OF THE DRAWINGS

These and/or other aspects and advantages will become apparent and more readily appreciated from the following description of the embodiments, taken in conjunction with the accompanying drawings of which:

FIGS. 3A through 4 explain the operation of a model primitive generating unit illustrated in FIG. 2;

FIGS. 6A through 8C explain the operations of a first detecting unit and a second detecting unit illustrated in FIG. 2.

DETAILED DESCRIPTION OF EMBODIMENTS

Reference will now be made in detail to embodiments, examples of which are illustrated in the accompanying drawings, wherein like reference numerals refer to the like elements throughout. Embodiments are described below to explain the present invention by referring to the figures.

Figure 1:
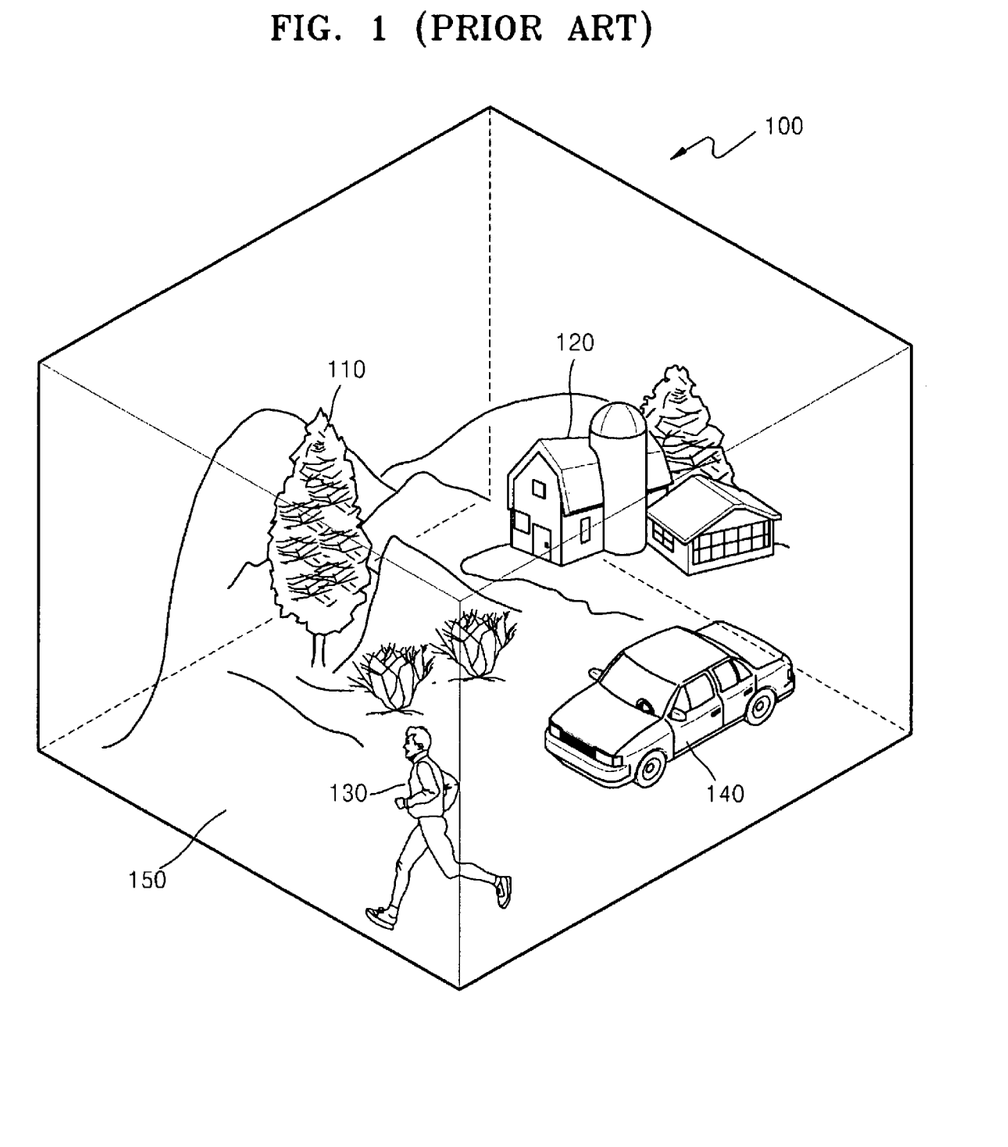
FIG. 1 explains a scene, objects, and a background.

FIG. 1 explains a scene 100, including objects 110, 120, 130, and 140, and a background 150.

The scene 100 refers to a three-dimensional space in which information that is to be rendered may be contained. The scene 100 may include one or more objects, such as objects 110, 120, 130, and 140, and background 150, for example. Here, objects 110, 120, 130, or 140 may be static objects such as a tree 110 or a house 120, or may be dynamic objects such as a moving person 130 or a moving car 140. Meanwhile, the background 150 typically refers to a setting (for example, the sky or ground) at which the objects 110, 120, 130, or 140 may be positioned. In an embodiment, the locations of the dynamic objects 130 and 140 may change with the passage of time.

In scene 100, models may collide with each other. Here, the term "model" may mean object 110, 120, 130, or 140, or may mean background 150. That is, the collision may occur between objects 110, 120, 130, and 140, or between one or more objects and the background 150.

Figure 2:
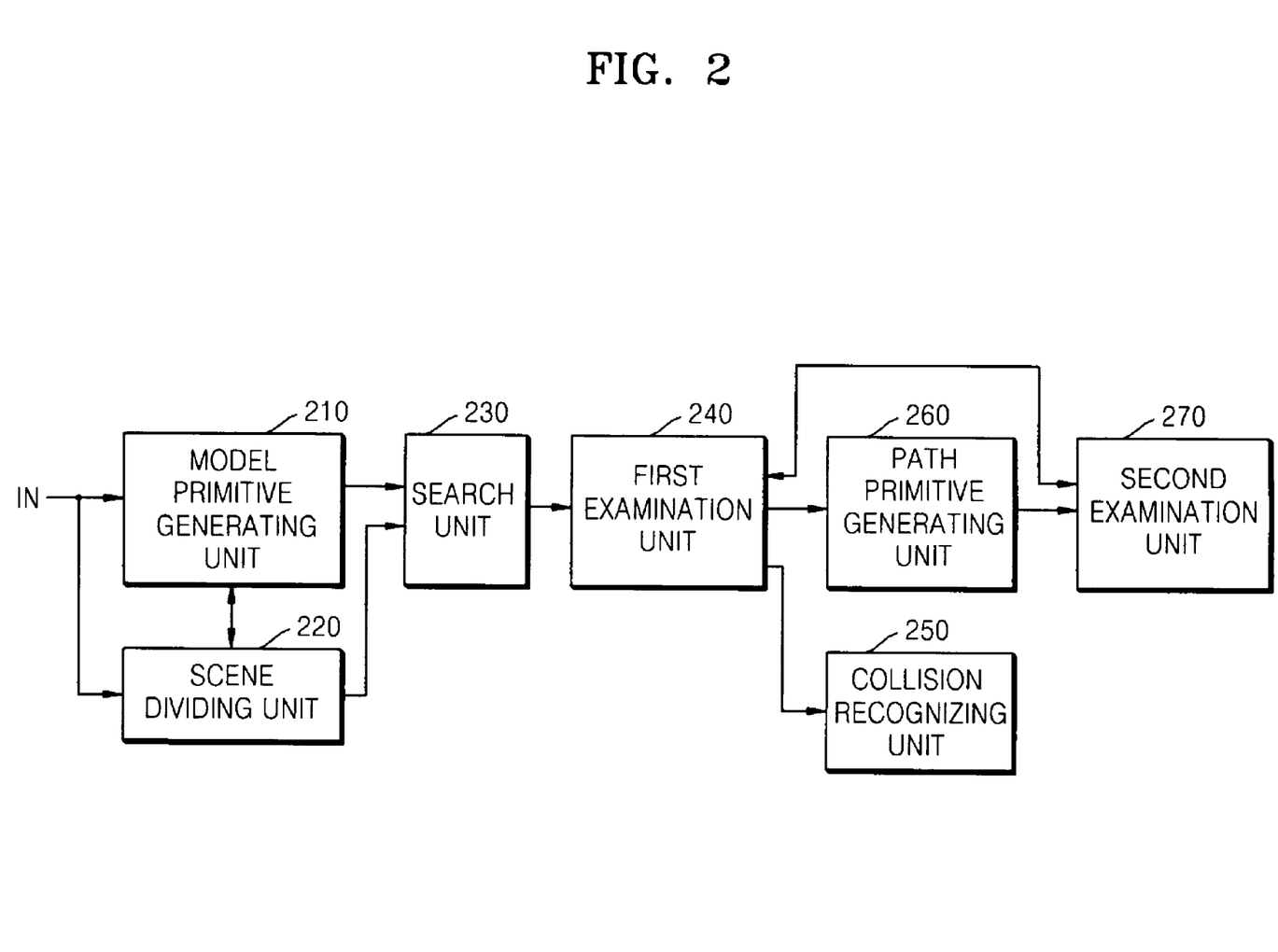
FIG. 2 illustrates a model collision detection apparatus, according to an embodiment of the present invention.

FIG. 2 illustrates a model collision detection apparatus, according to an embodiment of the present invention. Referring to FIG. 2, the model collision detection apparatus may include, for example, a model primitive generating unit 210, a scene dividing unit 220, a search unit 230, a first examination unit 240, a collision recognizing unit 250, a path primitive generating unit 260, and a second examination unit 270.

The model primitive generating unit 210 may receive a scene through an input terminal "IN," and may generate a primitive (hereinafter, referred to as a model primitive) for each model included in the scene. Here, the term "primitive" may refer to an "object for enveloping". That is, the term "model primitive" may refer to an object for enveloping a model. Meanwhile, the primitive typically has a predetermined shape. For example, the model primitive may have a shape of an object having a minimum volume among objects which can envelope the corresponding model.

The scene dividing unit 220 may receive the scene through the input terminal IN, and divide the scene into a plurality of voxels. Thus, the scene generally has a voxel structure, with each of the voxels generally having the same size and volume. Here, the scene dividing unit 220 may generate a plurality of voxels each of which may have a volume obtained by multiplying an average volume of all model primitives included in the scene by a predetermined value (for example, 4).

Meanwhile, the scene received through the input terminal IN is updated with the passage of time, but in an embodiment it is preferable that the model primitive generating unit 210 and the scene dividing unit 220 operate one time. That is, in an embodiment it is preferable that, if model primitives have been generated in advance for all models included in the scene received through the input terminal IN, the primitive generating unit 210 does not operate any more. Likewise, in an embodiment it is preferable that, if the scene received through the input terminal IN has been divided in advance into a plurality of voxels, the scene dividing unit 220 does not operate any more.

Meanwhile, the remaining components (that is, the search unit 230 through the second examination unit 270) of the model collision detection apparatus may operate with respect to a scene, at every predetermined collision checking time (for example, t0, t1, t2, t3, t4, t5, . . . ). Here, the terms "a current time" and "a previous time" generally denote two collision checking times that are adjacent in time with respect to each other. For example, "a current time" and "a previous time" may be "t1" and "t0" respectively, "t3" and "t2" respectively, or "t4" and "t3" respectively. Hereinafter, for convenience of description, it may be assumed that "a current time" and "a previous time" are "t2" and "t1" respectively.

The search unit 230 may search for at least one voxel in which model primitives may collide with each other at a current time t2, among the voxels constructing the scene. In detail, the search unit 230 may search for at least one voxel in which a plurality of model primitives exist, among voxels constructing a scene at a current time t2. Here, the model primitives that exist in the voxel may be model primitives that are entirely included in the voxel, or model primitives having parts laid across the voxel, e.g., having only a portion of the model primitive included in the voxel. Meanwhile, the model collision detection apparatus may operate according to a simple detection mode, or according to a full detection mode.

When the model collision detection apparatus operates according to a full detection mode, the first examination unit 240 through the second examination unit 270 generally operate as follows.

The first examination unit 240 may determine whether model primitives collide with each other for each voxel searched for by the search unit 230. The first examination unit 240 may output the result of the determination as a first control signal to the collision recognizing unit 250, or to the path primitive generating unit 260 and the second examination unit 270. At this time, the first examination unit 240 may determine whether the model primitives collide with each other, e.g., using location information of the model primitives. For example, if the volume of a space shared by model primitives exceeds a predetermined threshold value, it may be determined that a collision has occurred between the model primitives.

The collision recognizing unit 250 may recognize collisions between models corresponding to the model primitives, in response to the first control signal. The collision recognizing unit 250 generally operates only when the first control signal indicates that model primitives collide with each other at a current time, e.g., t2. That is, if the first examination unit 240 determines that the model primitives collide with each other at the current time t2, the collision recognizing unit 250 may recognize that models corresponding to the model primitives collide with each other at the current time t2. As such, since collisions between models may be determined by detecting collision between model primitives, collision between models may be quickly detected.

The path primitive generating unit 260 may generate path primitives each of which is an object for enveloping each of paths between the current time t2 and the previous time t1, for the models, in response to the first control signal, and output the path primitives to the second examination unit 270. The path primitive generating unit 260 operates only when the first control signal indicates that the model primitive do not collide with each other at the current time t2. That is, if the first examination unit 240 determines that the model primitives do not collide with each other at the current time t2, the path primitive generating unit 260 may generate a path primitive for a path between the current time t2 and the previous time t1, with respect to each model primitive.

The second examination unit 270 may determine whether the path primitives overlap each other, in response to the first control signal, and output the result of the determination as a second control signal to the first examination unit 240. The second examination unit 270 generally operates only when the first control signal indicates that the model primitives do not collide with each other at the current time t2. That is, if the first examination unit 240 determines that the model primitives do not collide with each other at the current time t2, the second examination unit 270 may determine whether the path primitives overlap each other. If the path primitives overlap each other, the second examination unit 270 may determine that although the model primitives do not collide with each other at the current time t2, the model primitives may potentially collide with each other at an arbitrary time, e.g., between the current time t2 and the previous time t1. Meanwhile, if the path primitives do not overlap each other, the second examination unit 270 may determine that the model primitives neither collide with each other at the current time t2, nor at any time between the current time t2 and the previous time t1.

If the second control signal indicates that the path primitives overlap each other, the first examination unit 240 may determine whether the model primitives collide with each other at an arbitrary time t' between the current time t2 and the previous time t1, in response to the second control signal, and may output the result of the determination as a third control signal to the collision recognition unit 250, wherein, as an example, t' may be (t1+t2)/2.

If it is determined that the model primitives collide with each other at an arbitrary time t' between the current time t2 and the previous time t1, the collision recognizing unit 250 may determine that the models corresponding to the model primitives collide with each other at the arbitrary time t', in response to the third control signal.

Further, if the model primitives do not collide at an arbitrary time t' between the current time t2 and the previous time t1, the first examination unit 240 may determine whether the model primitives collide with each other at a different arbitrary time t" between the current time t2 and the previous time t1, and output the result of the determination as a third control signal to the collision recognizing unit 250, wherein, as examples, t" can be (t1+t')/2 or (t'+t2)/2. Further, if it is determined that the model primitives collide with each other at the different arbitrary time t" between the current time t2 and the previous time t1, the collision recognition unit 250 may recognize that models corresponding to the model primitives collide with each other at the different arbitrary time t", in response to the third control signal. However, if it is determined that the model primitives do not collide with each other at the different arbitrary time t" between the current time t2 and the previous time t1, the first examination unit 240 may determine whether the model primitives collide with each other at another different arbitrary time t''' between the current time t2 and the previous time t1, and may output the result of the determination as a third control signal to the collision recognizing unit 250, wherein t''' can be (t1+t")/2.

In this way, if the first examination unit 240 determines that the model primitives do not collide with each other at the current time t2, and the second examination unit 270 determines that the path primitives of the model primitives do not overlap each other, the first examination unit 240 may determine whether the model primitives collide with each other at an arbitrary time between the current time t1 and the previous time t2. Further, the first examination unit 240 may repeatedly determine (for a predetermined quantity of times) whether the model primitives collide with each other at an arbitrary time between the current time and the previous time, while changing a value of the arbitrary time, until it is determined that the model primitives collide with each other at the arbitrary time between the current time and the previous time. Here, the quantity of times may be set below a predetermined threshold value.

Meanwhile, if the model collision detection apparatus operates according to a simple detection mode, the path primitive generating unit 260 and the second examination unit 270 generally do not operate, and the first examination unit 240 and the collision recognizing unit 250 operate as follows.

The first examination unit 240 may determine whether the model primitives collide with each other at the current time t2, for each voxel searched for by the search unit 230, and may output the result of the determination as a first control signal to the collision recognizing unit 250. At this time, the first examination unit 240 may determine whether the model primitives collide with each other, using location information of the model primitives.

In contrast with a full detection mode, according to an embodiment of a simple detection mode, although the first examination unit 240 may determine that the model primitives do not collide with each other at the current point t2, the first examination unit 240 generally does not output the first control signal to the path primitive generating unit 260 and the second examination unit 270. Accordingly, when the model collision detection apparatus operates according to a simple detection mode, the path primitive generating unit 260 and the second examination unit 270 generally do not operate. As a result, when the first examination unit 240 operates according to a simple detection mode, the second control signal generally is not input to the first examination unit 240, and accordingly, the first examination unit 240 generally does not output the third control signal.

Meanwhile, the collision recognizing unit 250 may recognizes a collision between the corresponding models, in response to the first control signal. Here, the collision recognizing unit 250 may operate only when it receives the first control signal indicating that the model primitives collide with each other at the current time t2. That is, if the first examination unit 240 determines that the model primitives collide with each other at the current time t2, the collision recognizing unit 250 may recognize a collision between models corresponding to the model primitives at the current time t2.

In contrast with a full detection mode, according to an embodiment of a simple detection mode, the third control signal generally is not input to the collision recognizing unit 250.

As described above, the model collision detection apparatus according to a current embodiment of the present invention considers all possible cases of collision between all models included in a scene. That is, the model collision detection apparatus examines whether models collide with each other while synchronizing the models with each other. Accordingly, if a collision determination is changed, the model collision detection apparatus simultaneously updates locations of the models which are included in the scene to correspond to the changed determination time, and then determines whether collisions occur between model primitives of the models.

Figure 3A:
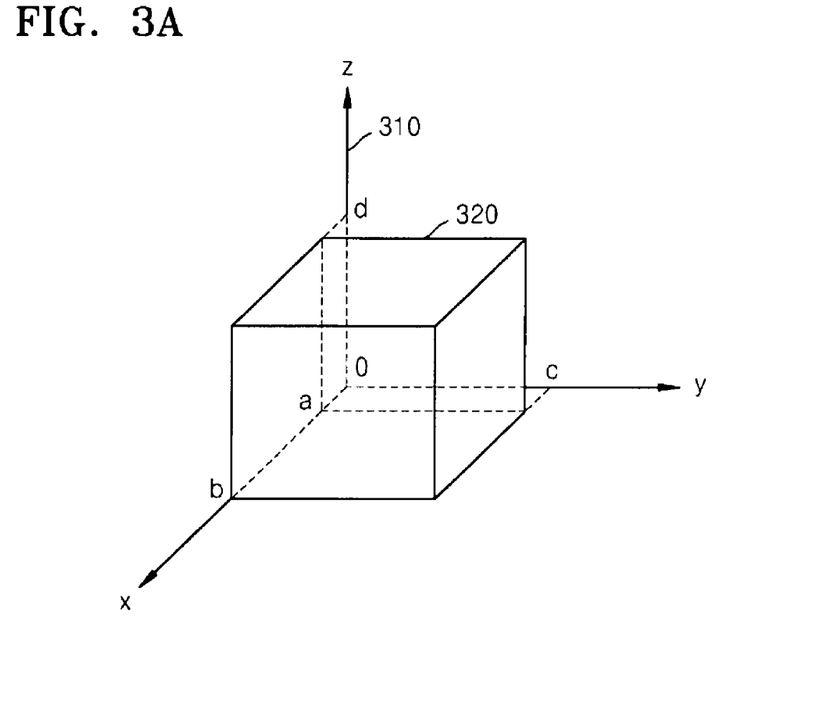
Figure 4A:
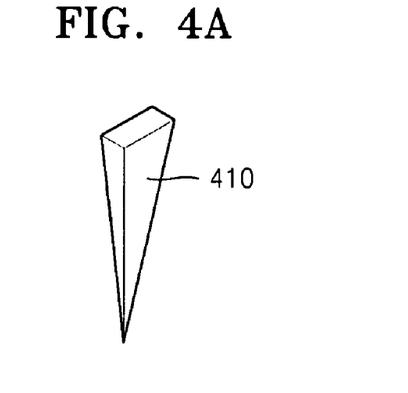
Figure 4B:
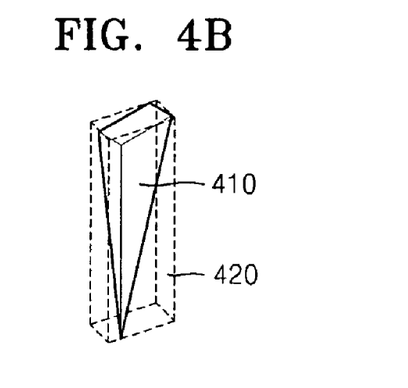
Figure 4C:
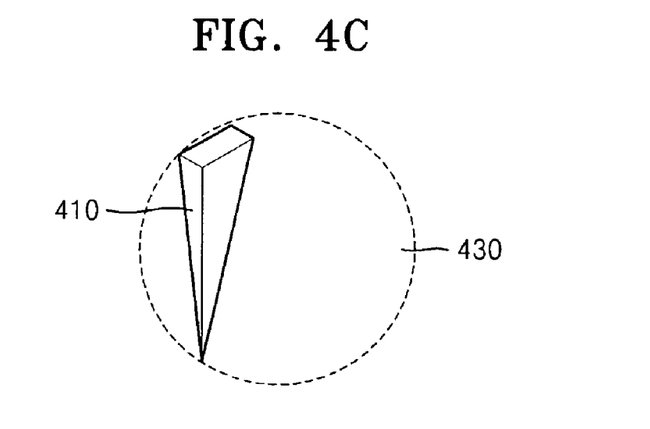

FIGS. 3A through 4 explain the operation of the model primitive generating unit 210 illustrated in FIG. 2.

Figure 3B:
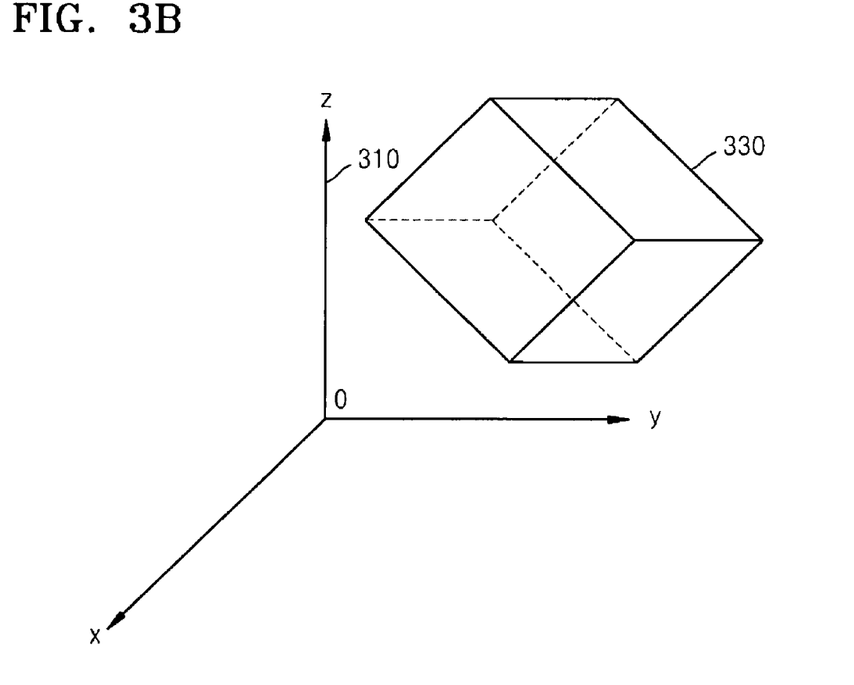
Figure 3C:
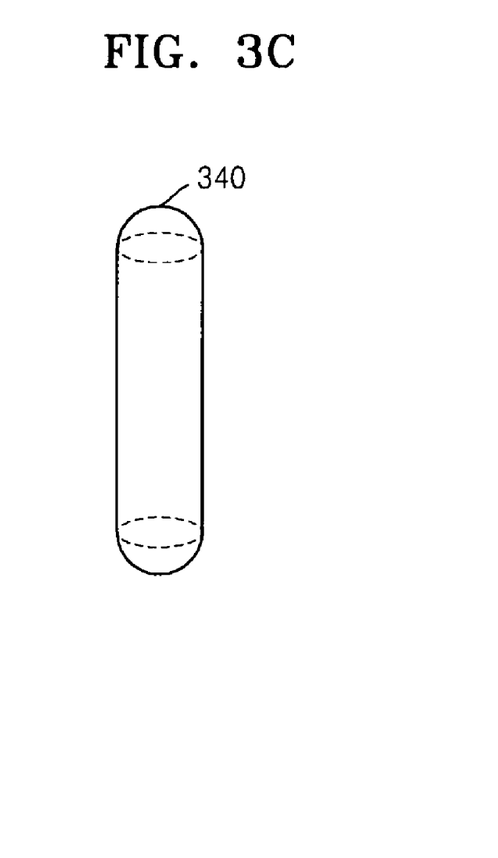
Figure 3D:
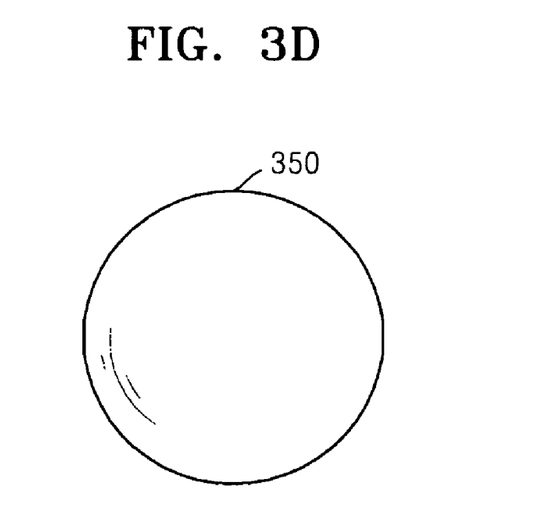

In detail, FIGS. 3A through 3D illustrate examples of various shapes that a model primitive may have. That is, a model primitive may have the shapes of an axis aligned bounding box (AABB) 320 as illustrated in FIG. 3A, an oriented bounding box (OBB) 330 as illustrated in FIG. 3B, a capsule 340 as illustrated in FIG. 3C, and a sphere 350 as illustrated in FIG. 3D. Further, a model primitive may equally have other shapes not expressly described here.

Here, the AABB 320 is a hexahedron in which three edges meeting at a point are respectively parallel to three-dimensional (3D) axes 310 of x-axis, y-axis, and z-axis. Here, the directions of the 3D axes 310 may be set in advance. Meanwhile, the OBB 330 is a hexahedron formed by rotating the AABB 320 by a predetermined angle or moving the AABB 320 by a predetermined distance (while rotating the AABB 320 by a predetermined angle) with respect to the 3D axes 310.

Meanwhile, (a), (b), and (c) of FIG. 4 explain an optimal shape that a model primitive may have. The model primitive 420 illustrated in (b) of FIG. 4 is more desirable in an embodiment than the model primitive 430 illustrated in (c) of FIG. 4. Each of the model primitives (b) and (c) may correspond to a model 410 illustrated in (a) of FIG. 4. As such, the most desirable model primitive corresponding to a certain model is typically a model primitive having a volume closest to the volume of the model.

Figure 5:
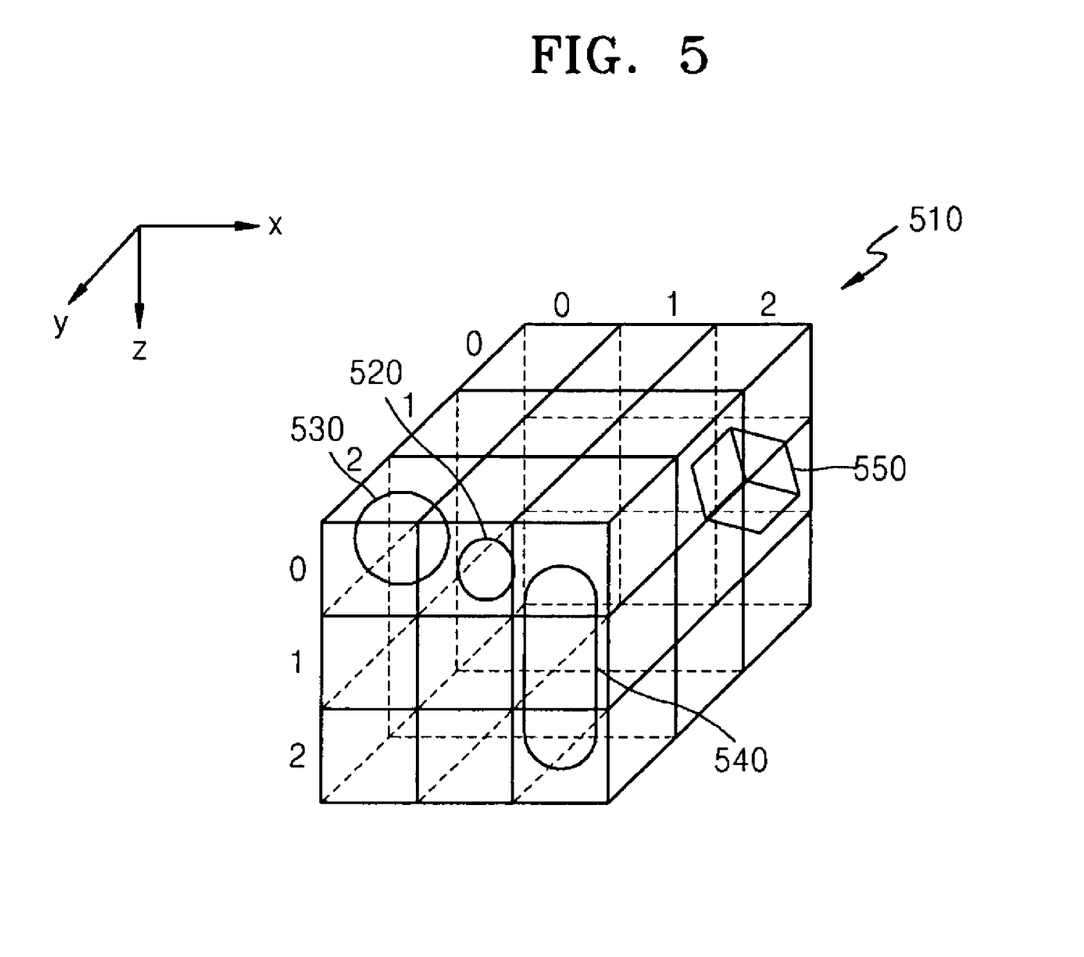
FIG. 5 explains the operations of a scene dividing unit and a search unit illustrated in FIG. 2.

FIG. 5 explains the operations of the scene dividing unit 220 and the search unit 230 illustrated in FIG. 2.

As illustrated in FIG. 5, a plurality of model primitives 520, 530, 540, and 550 may be located in a scene 510 at a current time t2, and the scene 510 may be divided into 27 voxels by the scene dividing unit 220 (see FIG. 2).

In FIG. 5, numbers 0, 1, and 2 are indexes to be used for representing coordinate values, for convenience of description, and each voxel may have a coordinate value using the indexes. As illustrated in FIG. 5, the model primitive 520 exists in a voxel having a coordinate value (i, j, k)=(0, 1, 1), the model primitive 530 exists in voxels having coordinate values (i, j, k)=(0, 1, 0), (0, 1, 1), (0, 2, 0), and (0, 2, 1), the model primitive 540 exists in voxels having coordinate values (i, j, k)=(2, 2, 0), (2, 2, 1), and (2, 2, 2), and the model primitive 550 exists in voxels having coordinate values (i, j, k)=(1, 0, 1), (1, 1, 1), (2, 0, 1), and (2, 1, 1), wherein i represents an index in a x-axis direction, j represents an index in a y-axis direction, and k represents an index in a z-axis direction.

As illustrated in FIG. 5, a plurality of model primitives exist in the voxel having the coordinate value (i, j, k)=(0, 1, 1), among the 27 voxels. Accordingly, the search unit 230 may search for the voxel having the coordinate value (i, j, k)=(0, 1, 1), as a voxel in which model primitives may collide with each other, among the voxels constructing the scene 510 at the current time t2.

FIGS. 6A through 8C explain the operations of the first examination unit 240 through the second examination unit 270 illustrated in FIG. 2.

Figure 6A:
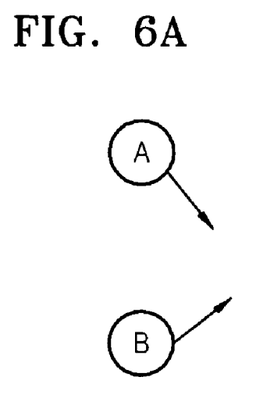
Figure 6B:
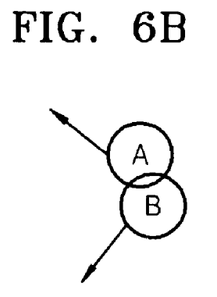
Figure 6C:
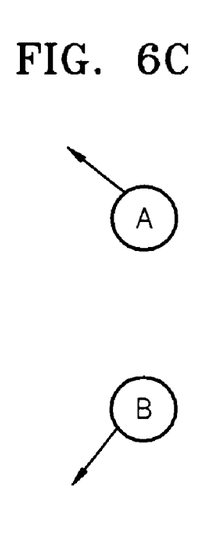

In detail, FIG. 6A shows the locations of model primitives A and B at a previous time t1, FIG. 6B shows the locations of the model primitives A and B at an arbitrary time t' between the previous time t1 and a current time t2, and FIG. 6C shows the locations of the model primitives at the current time t2. In FIGS. 6A through 6C, arrows represent instantaneous velocities of the model primitives.

Referring to FIGS. 2 and 6A through 6C, in a simple detection mode, if the first examination unit 240 determines that the model primitives A and B do not collide with each other at the current time t2, the collision recognizing unit 250 through the second examination unit 270 typically do not operate. As a result, in a simple detection mode, the model collision detection apparatus may be unable to recognize collisions which occurs at an arbitrary time t' between the previous time t1 and a current time t2.

In contrast, for a full detection mode, if the first examination unit 240 determines that the model primitives A and B do not collide with each other at the current time t2, the path primitive generating unit 260 and the second examination unit 270 may then typically operate. Accordingly, the path primitive generating unit 260 generates a path primitive which envelopes a path between the current time t2 and the previous time t1 for the model primitive A, and a path primitive which envelopes a path between the current time t2 and the previous time t1 for the model primitive B. The second examination unit 270 determines whether the path primitive of the model primitive A overlaps the path primitive of the model primitive B. In FIG. 6B, the path primitive of the model primitive A overlaps the path primitive of the model primitive B. Accordingly, if it is determined that the path primitive of the model primitive A overlaps the path primitive of the model primitive B, the first examination unit 240 may determine whether the model primitives A and B collide with each other at an arbitrary time t'. Referring to FIG. 6B, if it is determined that the model primitives A and B collide with each other at an arbitrary time t', the collision recognizing unit 250 may determine that model primitives A and B collide with each other at the arbitrary time t'.

Hereinafter, the operations of the first examination unit 240 through the second examination unit 270 in a full detection mode will be described in more detail with reference to FIGS. 7A through 8C.

Figure 7A:
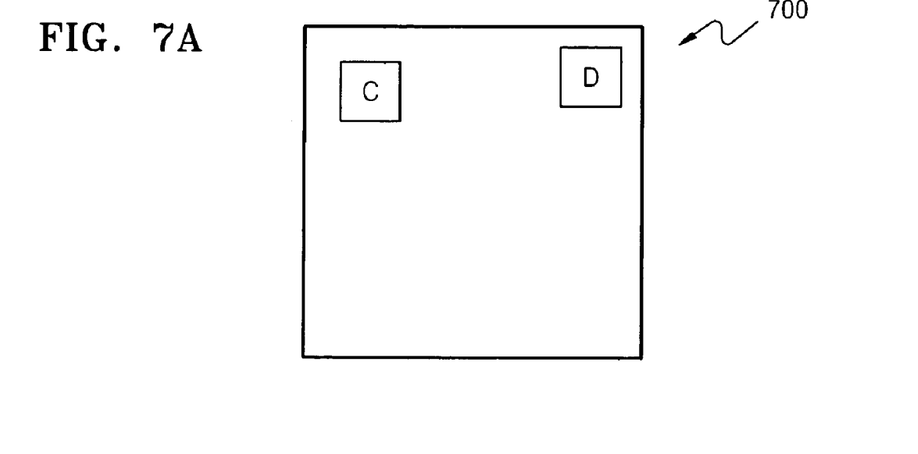
Figure 7B:
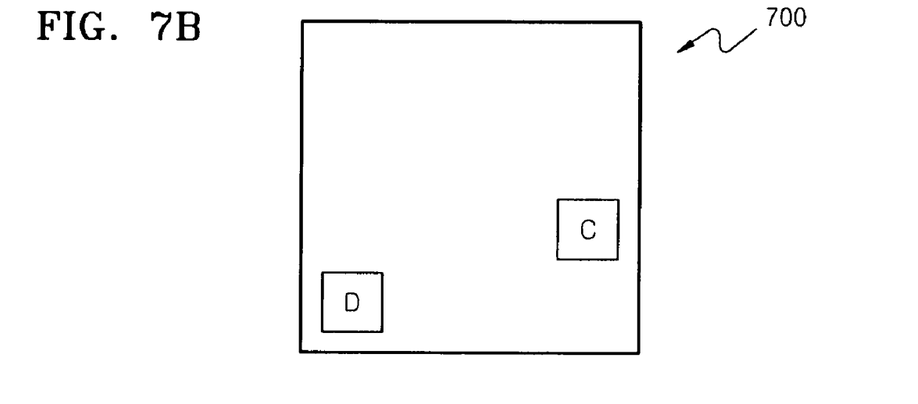
Figure 7C:
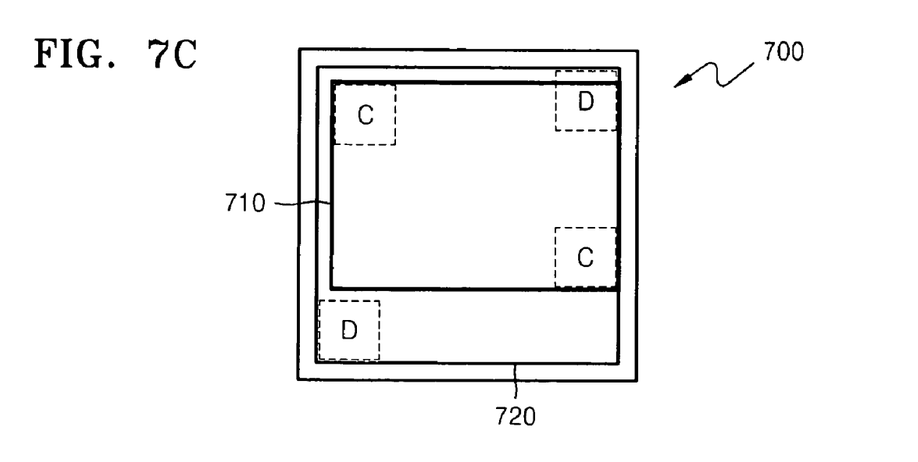

FIG. 7A shows the locations of model primitives C and D at a current time t2 on a scene 700, FIG. 7B shows the locations of the model primitives C and D at a previous time t1 on the scene 700, and FIG. 7C shows a path primitive 710 of the model primitive C and a path primitive 720 of the model primitive D. As illustrated in FIGS. 7A, 7B, and 7C, the model primitives C and D and the corresponding path primitives have shapes corresponding to the AABB (see FIG. 3A), and the scene 700 is shown on a two-dimensional plane since the scene 700 is viewed in a predetermined direction.

As illustrated in FIG. 7C, the path primitive 710 of the model primitive C overlaps the path primitive 720 of the model primitive D. In this case, if the model primitives C and D move from the locations illustrated in FIG. 7B to the locations illustrated in FIG. 7A, the model primitives C and D may collide with each other at an arbitrary time between the current time t2 and the previous time t1, according to the moving velocities of the model primitives C and D. Accordingly, when the first examination unit 240 operates according to a full detection mode and determines whether the model primitives C and D collide with each other at the current time t2, although it is determined that the model primitives C and D do not collide with each other at the current point t2, the first examination unit 240 may repeatedly determine (for a quantity of times) whether the model primitives C and D collide with each other at an arbitrary time between the current time t2 and the previous time t1 while changing a collision checking time between the current time t2 and the previous time t1. The determination is continued until it is determined whether the model primitives C and D collide with each other at an arbitrary time between the current time t2 and the previous time t1. If it is not determined that the model primitives C and D collide with each other at an arbitrary time by the time the number of times reaches a threshold value, in an embodiment it is preferable that the first examination unit 240 stops detecting collision between the model primitives C and D.

Figure 8A:
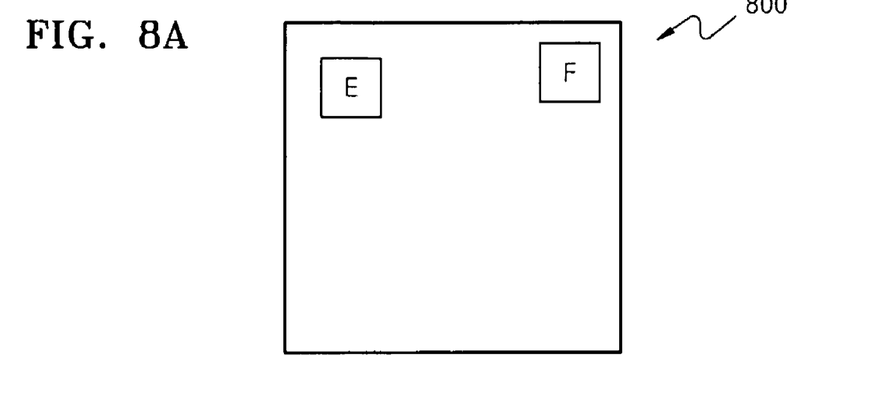
Figure 8B:
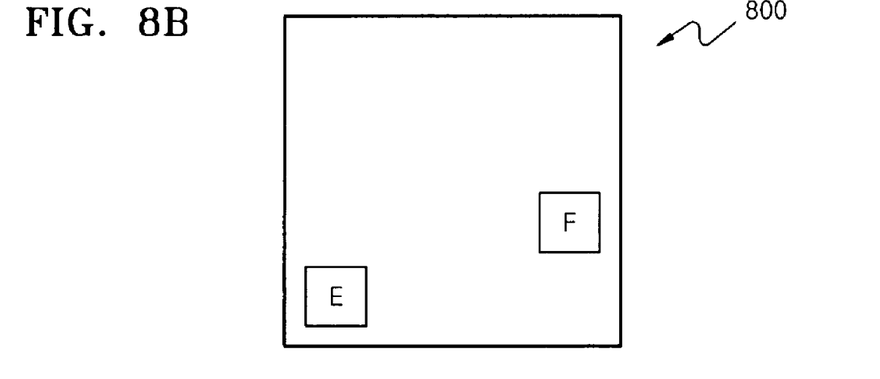
Figure 8C:
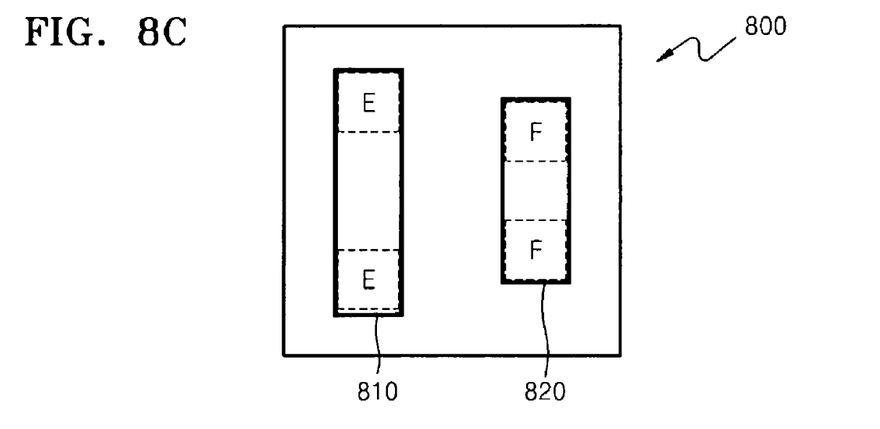

FIG. 8A shows the locations of model primitives E and F at a current time t2 on a scene 800, FIG. 8B shows the locations of model primitives E and F at a previous time t1 on the scene 800, and FIG. 8C shows a path primitive 810 of the model primitives E and a path primitive 820 of the model primitive F. As illustrated in FIGS. 8A, 8B, and 8C, each of the model primitives E and F and the corresponding path primitives have a shape corresponding to the AABB (see FIG. 3A), and the scene 800 is shown on a two-dimensional plane since the scene 800 is viewed in a predetermined direction.

Referring to FIG. 8C, the path primitive of the model primitive E does not overlap the path primitive 820 of the model primitive F. Here, the model primitives E and F should not have collided with each other between the current time t2 and the previous time t1. Here, although the first examination unit 240 operates according to a full detection mode, no determination of a collision between the model primitives E and F at an arbitrary time between the current time t2 and the previous time t1 need be performed.

Figure 9:
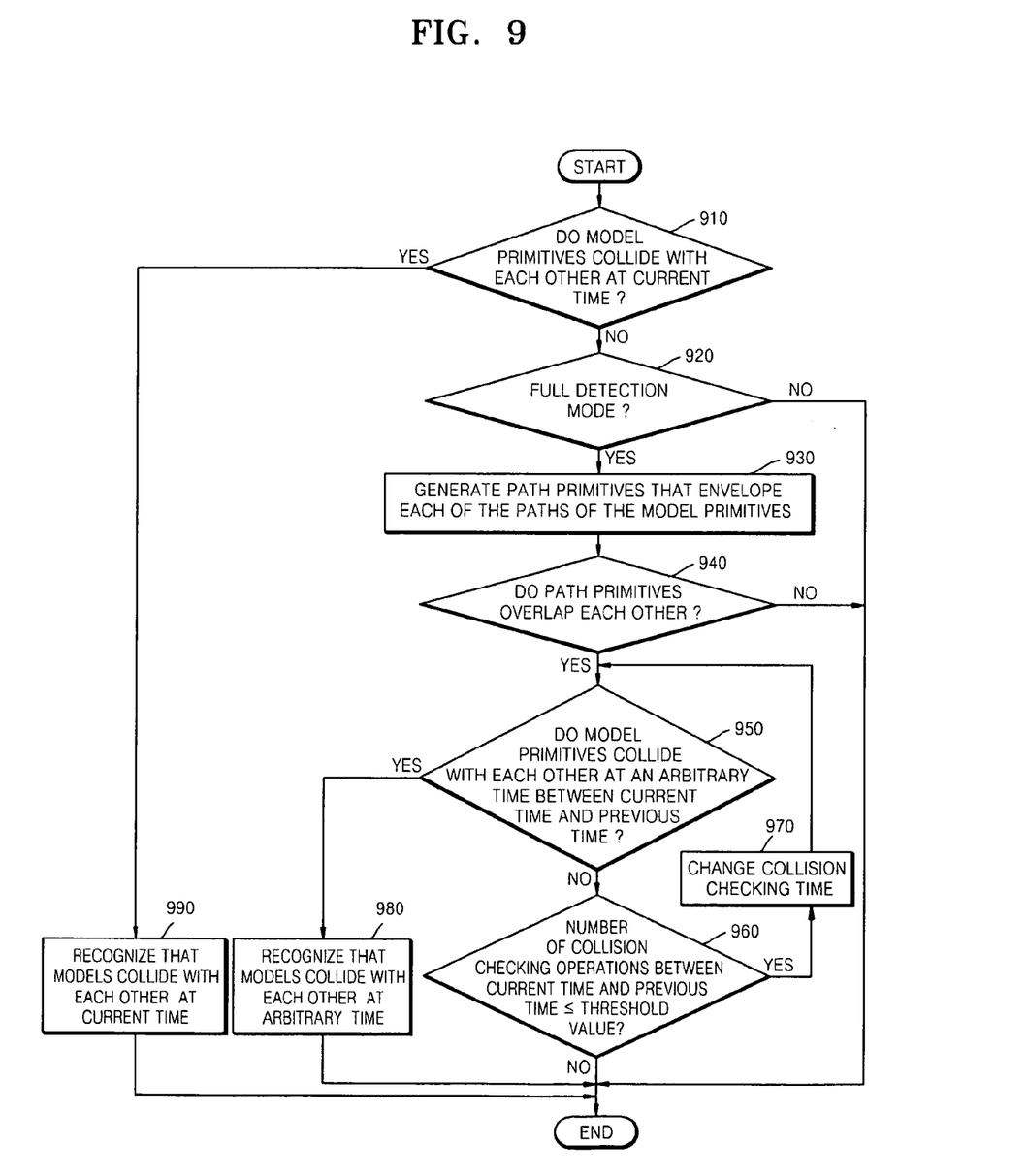
FIG. 9 illustrates a model collision detection method, according to an embodiment of the present invention.

FIG. 9 illustrates a model collision detecting method. The method may be performed, for example, by the model collision detecting apparatus illustrated in FIG. 2, according to an embodiment of the present invention. The model collision detecting method may include operations 910 through 990 for quickly detecting collision between models without missing collisions when they occur between predetermined collision check times. It should be noted that the described apparatus, units and method are mutually exclusive, and should not be limited to the same.

Referring to FIGS. 2 and 9, it may be determined whether model primitives collide with each other at a current time in operation 910, e.g., by the first examination unit 240.

If it is determined in operation 910 that the model primitives do not collide with each other, it may be determined whether the model collision detecting apparatus operates according to a full detection mode in operation 920, e.g., by the first examination unit 240.

If it is determined in operation 920 that the model collision detecting apparatus operates according to a full detection mode, path primitives which envelope paths between the current time and the previous time for the model primitives may be generated in operation 930, e.g., by the path primitive generating unit 260.

After operation 930, it may be determined whether the path primitives overlap each other in operation 940, e.g. by the second examination unit 270.

If it is determined in operation 940 that the path primitives overlap each other, it may be determined whether the model primitives collide with each other at an arbitrary time between the current time and the previous time in operation 950, e.g. by the first examination unit 240.

If it is determined in operation 950 that the model primitives do not collide with each other, it may be determined whether the quantity of times that operation 950 has been performed is below a threshold value in operation 960. If the number of times that operation 950 has been performed has reached the threshold value, the process may be terminated. However, if the number of times that operation 950 has been performed is below the threshold value, a value of the arbitrary time between the current time and the previous time may be changed in operation 970, and then operation 950 may be re-executed using the new arbitrary time value.

Meanwhile, if it is determined in operation 950 that the model primitives collide with each other, it may be recognized that models corresponding to the model primitives collide with each other at an arbitrary time in operation 980, e.g. by the collision recognizing unit 250.

Also, if it is determined in operation 910 that the model primitives collide with each other at the current time, the collision between the model primitives at the current time may be recognized in operation 990, e.g., by the collision recognizing unit 250.

Meanwhile, if it is determined in operation 920 that the model collision detecting apparatus does not operate according to a full detection mode, or if it is determined in operation 940 that the path primitives do not overlap each other, the process may be terminated.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, since a model collision detection method, medium and apparatus according to one or more embodiments of the present invention may recognize that models collide with each other if it is determined that model primitives which envelop each of the models collide with each other, in embodiments of the present invention, it is possible to quickly examine whether models collide with each other. Also, in the model collision detecting method, medium and apparatus according to one or more embodiments of the present invention, when it is determined that the model primitives do not collide with each other at a current time, it may be determined whether path primitives which envelop paths between the current time and a previous time overlap each other, instead of stopping the determining of whether the models collide. If the path primitives overlap each other, it may be determined that collisions between the models could possibly be generated at an arbitrary time between the current time and the previous time, even though the models do not collide with each other at the current time. Then, it may be determined whether the model primitives collide with each other at an arbitrary time between the current time and the previous time, and collisions between the models at the arbitrary time are recognized if it is determined that the model primitives collide with each other at that time. Accordingly, although collision of the models may be generated at an arbitrary time which is not a predetermined collision check time, it is still possible to recognize the collision of the models without missing the recognition of the collision generated at the arbitrary time. This advantage may be enhanced by changing a value of a first arbitrary time to a second arbitrary time that is between the current time and the previous time instead of stopping the determining when it is determined that the model primitives do not collide at the first arbitrary time, and then again determining whether the model primitives collide with each other at the second arbitrary time.

Furthermore, in the model collision detection method, medium and apparatus according to one or more embodiments of the present invention, since all possible cases where all models included in a scene can collide with each other are considered, the model collision detection method, medium and apparatus according to one or more embodiments of the present invention examines whether models collide with each other while synchronizing the models with each other. Accordingly, in the model collision detecting method, medium and apparatus according to one or more embodiments of the present invention, when a collision checking time changes, the location of a model included in a scene and the location of another model included in the scene may be simultaneously updated to the corresponding locations of the two models at the changed collision checking time, and then it may be determined whether model primitives of the models collide with each other. Accordingly, a model collision detection method, medium and apparatus according to one or more embodiments of the present invention can prevent a determination of whether the model primitives of the two models collide with each other, while only the location of the model primitive of the model is updated to the corresponding location of the model at the changed collision checking time, and the location of the model primitive of the other model is not updated to the corresponding location of the other model at the changed collision checking time. Thus, it is possible to, in advance, prevent a case in which a collision between the models is not recognized for all that the models actually collide with each other, and ensure reliability of collision detection results.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of determining whether models collide with each other, the method comprising:
    determining whether the model primitives, each of which envelop each of the models, collide with each other at a current time;
    determining whether paths reflecting movement of the model primitives between the current time and a previous time overlap each other when the model primitives do not collide with each other at the current time;
    determining, by way of a processor, whether the model primitives collide with each other at an arbitrary time between the current time and the previous time when the path primitives overlap each other; and
    recognizing that the models collide with each other at the arbitrary time when the model primitives collide with each other at the arbitrary time.

2. The method of claim 1, wherein the determining of the whether the paths overlap each other further comprises:
    determining whether path primitives each of which envelop the paths of the model primitives overlap each other, if the model primitives do not collide with each other at the current time.

3. The method of claim 2, wherein each of the model primitives and the path primitives have a shape of at least one of an axis aligned bounding box (AABB), an oriented bounding box (OBB), a capsule, and a sphere.

4. The method of claim 1, wherein locations of the models are simultaneously updated.

5. The method of claim 1, further comprising:
    if the model primitives do not collide with each other at the arbitrary time, changing a value of the arbitrary time to a different value, and then, determining whether the model primitives collide with each other at the different value of the arbitrary time; and
    repeating the determining of whether the model primitives collide using new different values of the arbitrary time until it is recognized that the models collide with each other.

6. The method of claim 5, wherein the determining of whether the model primitives collide is performed repeatedly using the new different values until either it is determined that the model primitives collide or until the number of times the repetition is performed reaches a predetermined threshold value.

7. The method of claim 1, further comprising:
    recognizing that the models collide with each other at the current time when the model primitives collide with each other at the current time.

8. The method of claim 1, wherein each model is one of an object or a background.

9. At least one medium comprising computer readable code to control at least one processing element in a computer to implement the method of claim 1.

10. An apparatus for determining whether models collide with each other, the apparatus comprising:
a processor to control one or more processor-executable units;
a first examination unit to determine whether the model primitives, each of which envelop each of the models, collide with each other at a current time and to generate a first control signal corresponding to a result of the determination of whether the model primitives collide with each other at the current time;
a second examination unit to determine whether paths reflecting movement of the model primitives between the current time and a previous time overlap each other in response to the first control signal and generating a second control signal corresponding to a result of the determination of whether the paths overlap each other;
the first examination unit determining whether the model primitives collide with each other at an arbitrary time between the current time and the previous time in response to the second control signal and generating a third control signal corresponding to a result of the determination of whether the model primitives collide with each other at the arbitrary time; and
a collision recognizing unit to recognize that the models collide with each other in response to at least one of the first control signal and the third control signal.

11. The apparatus of claim 10, wherein the second examination unit determines whether path primitives each of which envelop the paths of the model primitives overlap each other in response to the first control signal, and generating the second control signal corresponding to a result of the determination of whether the paths overlap each other.

12. The apparatus of claim 11, wherein each of the model primitives and the path primitives have a shape of at least one of an axis aligned bounding box (AABB), an oriented bounding box (OBB), a capsule, and a sphere.

13. The apparatus of claim 10, wherein locations of the models are simultaneously updated.

14. The apparatus of claim 10, wherein the first examination unit repeatedly determines for a quantity of repetitions whether the model primitives collide with each other at the arbitrary time, while changing a value of the arbitrary time for each repetition.

15. The apparatus of claim 14, wherein the first examination unit repeatedly performs the determination of whether the model primitives collide with each other at an arbitrary time while changing a value of the arbitrary time for each repetition, until either it is determined that the model primitives collide with each other or until the quantity of repetitions reaches a predetermined threshold value.

16. The apparatus of claim 10, wherein each model is one of an object or a background.

17. A method of determining whether models collide with each other, the method comprising:
determining whether the model primitives, each of which envelop each of the models, collide with each other at a current time;
generating path primitives that envelop paths of the model primitives when the model primitives do not collide with each other at the current time, the paths reflecting movement of the model primitives between the current time and a previous time;
determining, by way of a processor, whether the model primitives collide with each other at an arbitrary time between the current time and the previous time when the path primitives overlap each other; and
recognizing that the models collide with each other at the current time when the model primitives collide with each other at the current time and recognizing that the models collide with each other at the arbitrary time when the model primitives collide with each other at the arbitrary time.

18. The method of claim 17, further comprising repeating the determining of whether the model primitives collide with each other using a second arbitrary time, between the current time and the previous time, but different than the arbitrary time, and continuing to repeat the determining for different arbitrary times until a quantity of completed determinations meets a threshold value.

19. At least one medium comprising computer readable code to control at least one processing element in a computer to implement the method of claim 17.

20. An apparatus for determining whether models collide with each other, the apparatus comprising:
a processor to control one or more processor-executable units;
a first examination unit to determine whether the model primitives, each of which envelop each of the models, collide with each other at a current time and to generate a first control signal corresponding to a result of the determination of whether the model primitives collide with each other at the current time;
a path primitive generating unit to generate path primitives that envelop paths of the model primitives when the model primitives do not collide with each other at the current time, the paths reflecting movement of the model primitives between the current time and a previous time;
a second examination unit to determine whether the path primitives overlap each other in response to the first control signal and generating a second control signal corresponding to a result of the determination of whether the path primitives overlap each other;
the first examination unit to determine whether the model primitives collide with each other at an arbitrary time between the current time and a previous time in response to the second control signal and generating a third control signal corresponding to a result of the determination of whether the model primitives collide with each other at the arbitrary time;
and
a collision recognizing unit to recognize that the models collide with each other in response to at least one of the first control signal and the third control signal.

* * * * *